US012625481B2

(12) United States Patent
Nadesan et al.

(10) Patent No.:  US 12,625,481 B2
(45) Date of Patent:      May 12, 2026

(54) BUILDING CONTROLLER WITH WIRING TERMINALS PROGRAMMABLE BETWEEN AN INPUT WIRING TERMINAL TYPE, AN OUTPUT WIRING TERMINAL TYPE, AND A COMMUNICATION WIRING TERMINAL TYPE

(71) Applicant: Honeywell International Inc., Charlotte, NC (US)

(72) Inventors: Prashanth Nadesan, Bangalore (IN); Rajendra Kumar S, Bangalore (IN); Suresh Vemuri, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 769 days.

(21) Appl. No.: 17/948,567

(22) Filed: Sep. 20, 2022

(65) Prior Publication Data

US 2024/0094696 A1      Mar. 21, 2024

(51) Int. Cl.
 G05B 19/04          (2006.01)
 G05B 19/042          (2006.01)
(52) U.S. Cl.
 CPC ............... G05B 19/0423 (2013.01); G05B 2219/25011 (2013.01)
(58) Field of Classification Search
 CPC ...... G05B 19/0423; G05B 2219/25011; G05B 2219/2614; G05B 2219/2642; G05B 19/054; G05B 19/056; H04L 12/283; H04L 12/2807; H04L 12/2816; H04L 12/40
 See application file for complete search history.

(56) References Cited

U.S. PATENT DOCUMENTS

| 4,072,380 | A | 2/1978 | Freehauf |
| 4,401,353 | A | 8/1983 | Mcdevitt et al. |
| 4,426,850 | A | 1/1984 | Reedy |
| 4,540,226 | A | 9/1985 | Thompson et al. |
| 4,609,241 | A | 9/1986 | Peterson |

(Continued)

FOREIGN PATENT DOCUMENTS

| EP | 3506032 A1 | 7/2019 |
| JP | S5053617 A | 5/1975 |
| WO | 2022171730 A1 | 8/2022 |

OTHER PUBLICATIONS

Spale, "netX-Network Controller for Automation," Furtwangen University, 6 pages, 2022.

(Continued)

*Primary Examiner* — Christopher W Carter
(74) *Attorney, Agent, or Firm* — Seager, Tufte & Wickhem, LLP

(57)          ABSTRACT

A building controller includes a housing and a plurality of wiring terminals that are secured relative to the housing and are physically accessible from outside of the housing. A controller is housed by the housing and is operatively coupled to the plurality of wiring terminals. The controller is field programmable to set each of two or more of the plurality of wiring terminals to a particular one of a plurality of wiring terminal types including an input wiring terminal type, an output wiring terminal type, and a communication wiring terminal type where the communication wiring terminal type operates in accordance with a predetermined communication protocol.

20 Claims, 12 Drawing Sheets

(56) References Cited

U.S. PATENT DOCUMENTS

| | | | |
|---|---|---|---|
| 4,788,520 A | 11/1988 | Strand | |
| 5,039,009 A | 8/1991 | Baldwin et al. | |
| 5,299,113 A | 3/1994 | England et al. | |
| 5,373,470 A | 12/1994 | Jones | |
| 5,376,930 A | 12/1994 | Merkle et al. | |
| 5,473,229 A | 12/1995 | Archer et al. | |
| 5,530,643 A | 6/1996 | Hodorowski | |
| 5,572,409 A | 11/1996 | Nathan et al. | |
| 5,673,418 A | 9/1997 | Stonier et al. | |
| 5,721,737 A | 2/1998 | Radjabi et al. | |
| 5,726,482 A | 3/1998 | Nathan et al. | |
| 5,727,170 A | 3/1998 | Mitchell et al. | |
| 5,754,823 A | 5/1998 | Mudryk et al. | |
| 5,764,507 A | 6/1998 | Chuo | |
| 5,787,299 A | 7/1998 | Ostler et al. | |
| 5,806,760 A | 9/1998 | Maiello | |
| 5,812,879 A | 9/1998 | Moro | |
| 5,917,229 A | 6/1999 | Nathan et al. | |
| 5,920,731 A | 7/1999 | Pletl et al. | |
| 5,950,709 A | 9/1999 | Krueger et al. | |
| 5,958,026 A | 9/1999 | Goetting et al. | |
| 6,000,458 A | 12/1999 | Watanabe | |
| 6,029,092 A | 2/2000 | Stein | |
| 6,169,937 B1 | 1/2001 | Peterson | |
| 6,289,409 B1 | 9/2001 | Bacigalupo | |
| 6,308,231 B1 | 10/2001 | Galecki et al. | |
| 6,363,137 B1 | 3/2002 | Nakao et al. | |
| 6,401,139 B1 | 6/2002 | Hamilton et al. | |
| 6,445,242 B2 | 9/2002 | Bloodworth et al. | |
| 6,472,903 B1 * | 10/2002 | Veenstra | H03K 19/17788 |
| | | | 326/38 |
| 6,505,245 B1 | 1/2003 | North et al. | |
| 6,564,561 B2 | 5/2003 | Daum et al. | |
| 6,618,628 B1 | 9/2003 | Davlin et al. | |
| 6,725,281 B1 | 4/2004 | Zintel et al. | |
| 6,728,258 B1 | 4/2004 | Okada et al. | |
| 6,825,689 B1 | 11/2004 | Snyder | |
| 6,832,185 B1 | 12/2004 | Musselman et al. | |
| 6,870,397 B1 | 3/2005 | Fox et al. | |
| 6,888,441 B2 | 5/2005 | Carey | |
| 7,034,570 B2 | 4/2006 | Mcclintock et al. | |
| 7,044,397 B2 | 5/2006 | Bartlett et al. | |
| 7,055,759 B2 | 6/2006 | Wacker et al. | |
| 7,068,164 B1 | 6/2006 | Duncan et al. | |
| 7,085,814 B1 | 8/2006 | Gandhi et al. | |
| 7,208,975 B1 | 4/2007 | Agrawal et al. | |
| 7,287,189 B1 | 10/2007 | Johnson et al. | |
| 7,330,919 B2 | 2/2008 | Zhang et al. | |
| 7,499,810 B1 | 3/2009 | Walker | |
| 7,680,967 B2 | 3/2010 | Broome et al. | |
| 7,722,800 B2 | 5/2010 | Williams et al. | |
| 7,844,764 B2 | 11/2010 | Williams | |
| 7,984,420 B2 | 7/2011 | Eldridge et al. | |
| 8,621,377 B2 | 12/2013 | D'Souza et al. | |
| 9,575,477 B2 | 2/2017 | Blount et al. | |
| 9,766,650 B2 | 9/2017 | Snyder | |
| 10,344,995 B2 | 7/2019 | Chinnaiyan | |
| 10,514,677 B2 | 12/2019 | Meruva et al. | |
| 10,989,427 B2 | 4/2021 | Maslekar et al. | |
| 11,193,682 B2 | 12/2021 | Vie et al. | |
| 2004/0238651 A1 | 12/2004 | Juntunen et al. | |
| 2005/0040248 A1 | 2/2005 | Wacker et al. | |
| 2005/0190303 A1 | 9/2005 | Kim et al. | |
| 2005/0192790 A1 | 9/2005 | Endo et al. | |
| 2006/0004492 A1 | 1/2006 | Terlson et al. | |
| 2006/0155900 A1 * | 7/2006 | Sagues | G05B 19/0423 |
| | | | 710/72 |
| 2006/0277027 A1 | 12/2006 | Mann et al. | |
| 2007/0255879 A1 * | 11/2007 | Sagues | G05B 19/054 |
| | | | 710/301 |
| 2008/0004725 A1 | 1/2008 | Wacker | |
| 2008/0046227 A1 | 2/2008 | Flamingo | |
| 2009/0082047 A1 | 3/2009 | Phillips et al. | |
| 2009/0088902 A1 * | 4/2009 | Williams | F24F 11/74 |
| | | | 700/278 |
| 2009/0113037 A1 | 4/2009 | Pouchak | |
| 2011/0226506 A1 | 9/2011 | Hamilton et al. | |
| 2011/0270449 A1 | 11/2011 | Nickerson et al. | |
| 2012/0146590 A1 | 6/2012 | Chiu et al. | |
| 2016/0048474 A1 | 2/2016 | Lv et al. | |
| 2017/0017231 A1 | 1/2017 | Toyota et al. | |
| 2017/0292729 A1 * | 10/2017 | Schuler | G05B 15/02 |
| 2018/0012173 A1 | 1/2018 | Leen et al. | |
| 2018/0087796 A1 | 3/2018 | Blair et al. | |
| 2018/0275625 A1 | 9/2018 | Park et al. | |
| 2018/0343139 A1 | 11/2018 | Saxena et al. | |
| 2019/0087076 A1 | 3/2019 | Dey et al. | |
| 2019/0310836 A1 | 10/2019 | Reicl | |
| 2020/0041154 A1 | 2/2020 | Ribbich et al. | |
| 2021/0120671 A1 | 4/2021 | Wheeler et al. | |
| 2021/0397149 A1 | 12/2021 | Ratakonda et al. | |
| 2021/0397160 A1 | 12/2021 | Poluri et al. | |
| 2022/0067226 A1 | 3/2022 | Harvey et al. | |

OTHER PUBLICATIONS

Extended European Search Report, EP Application No. 21178320.4, Nov. 22, 2021 (8 pages).

Combined Search and Examination Report under Sections 17 and 18(3), GB Application No. 2312906.7, Intellectual Property Office, Feb. 26, 2024 (11 pages).

Extended European Search Report, EP Application No. 23194884.5, European Patent Office, Feb. 15, 2024 (8 pages).

* cited by examiner

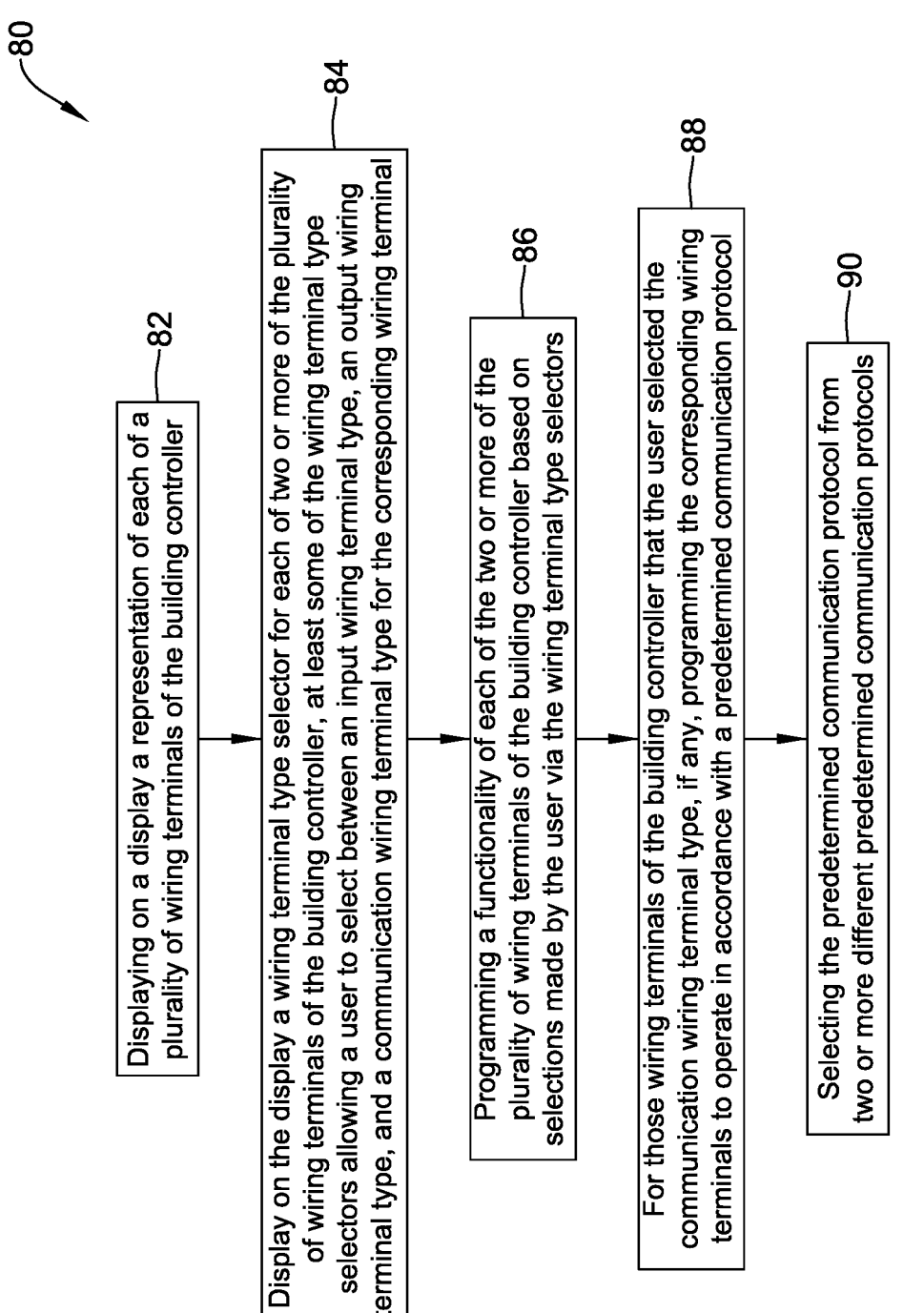

Displaying on a display a representation of each of a plurality of wiring terminals of the building controller — 82

Display on the display a wiring terminal type selector for each of two or more of the plurality of wiring terminals of the building controller, at least some of the wiring terminal type selectors allowing a user to select between an input wiring terminal type, an output wiring terminal type, and a communication wiring terminal type for the corresponding wiring terminal — 84

Programming a functionality of each of the two or more of the plurality of wiring terminals of the building controller based on selections made by the user via the wiring terminal type selectors — 86

For those wiring terminals of the building controller that the user selected the communication wiring terminal type, if any, programming the corresponding wiring terminals to operate in accordance with a predetermined communication protocol — 88

Selecting the predetermined communication protocol from two or more different predetermined communication protocols — 90

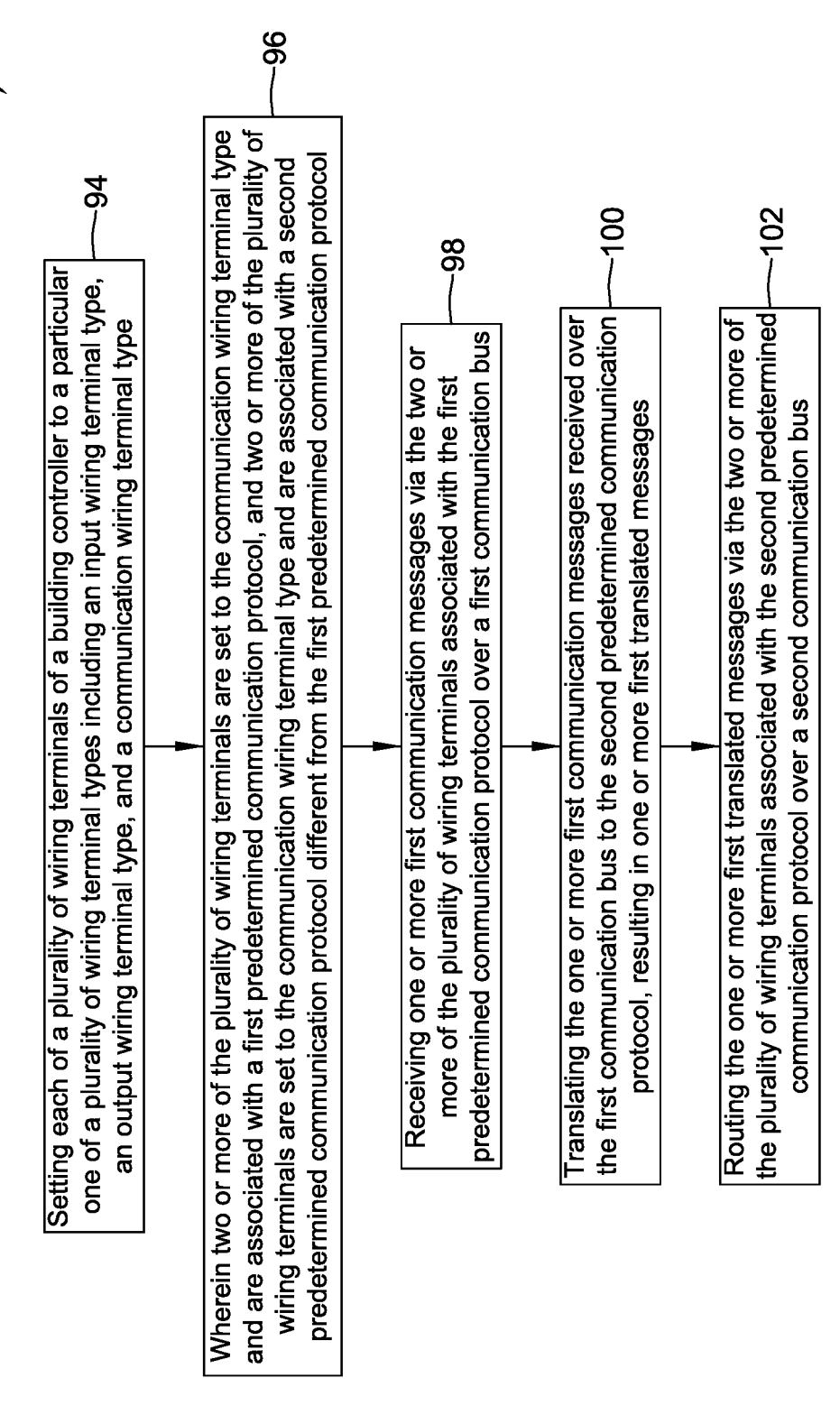

Setting each of a plurality of wiring terminals of a building controller to a particular one of a plurality of wiring terminal types including an input wiring terminal type, an output wiring terminal type, and a communication wiring terminal type Wherein two or more of the plurality of wiring terminals are set to the communication wiring terminal type and are associated with a first predetermined communication protocol, and two or more of the plurality of wiring terminals are set to the communication wiring terminal type and are associated with a second predetermined communication protocol different from the first predetermined communication protocol Receiving one or more first communication messages via the two or more of the plurality of wiring terminals associated with the first predetermined communication protocol over a first communication bus Translating the one or more first communication messages received over the first communication bus to the second predetermined communication protocol, resulting in one or more first translated messages Routing the one or more first translated messages via the two or more of the plurality of wiring terminals associated with the second predetermined communication protocol over a second communication bus

FIG. 9

BUILDING CONTROLLER WITH WIRING TERMINALS PROGRAMMABLE BETWEEN AN INPUT WIRING TERMINAL TYPE, AN OUTPUT WIRING TERMINAL TYPE, AND A COMMUNICATION WIRING TERMINAL TYPE

TECHNICAL FIELD

The present disclosure relates to building controllers, and more particularly, to building controllers having programmable wiring terminals.

BACKGROUND

Many controllers, including building controllers, are produced having fixed communication ports and fixed I/O control terminals. If all of the communication ports or I/O control terminals are used up, and the user wants the controller to be part of an additional network, or wants additional I/O control terminals, the user is required to add additional equipment such as an additional building controller. This can make the installation process expensive and complicated. In some cases, a building controller may have unused communication ports even though all of the I/O control terminals are used. A building controller may have unused I/O control terminals even though all of the communication ports have been used. What would be desirable is a building controller that allows a user to use unused communication ports as I/O control terminals, and/or to use unused I/O control terminals as communication ports. What would be desirable is a building controller having a plurality of wiring terminals that can be programmed to function as either communication ports or as I/O control terminals, depending on the need.

SUMMARY

This disclosure relates to building controllers, and more particularly, to building controllers having programmable wiring terminals. An example may be found in a building controller that includes a housing and a plurality of wiring terminals that are secured relative to the housing and are physically accessible from outside of the housing. A controller is housed by the housing and is operatively coupled to the plurality of wiring terminals. The controller is field programmable to set each of two or more of the plurality of wiring terminals to a particular one of a plurality of wiring terminal types including an input wiring terminal type, an output wiring terminal type, and a communication wiring terminal type where the communication wiring terminal type is configured to operate in accordance with a predetermined communication protocol.

Another example may be found in a method for programming a building controller. The example method includes displaying on a display a representation of each of a plurality of wiring terminals of the building controller. A wiring terminal type selector for each of two or more of the plurality of wiring terminals of the building controller is displayed on the display. At least some of the wiring terminal type selectors allow a user to select between an input wiring terminal type, an output wiring terminal type, and a communication wiring terminal type for the corresponding wiring terminal of the building controller. A functionality of each of the two or more of the plurality of wiring terminals of the building controller is then programmed based on selections made by the user via the wiring terminal type selectors.

Another example may be found in a method that includes setting each of a plurality of wiring terminals of a building controller to a particular one of a plurality of wiring terminal types including an input wiring terminal type, an output wiring terminal type, and a communication wiring terminal type. Two or more of the plurality of wiring terminals are set to the communication wiring terminal type and are associated with a first predetermined communication protocol, and two or more of the plurality of wiring terminals are set to the communication wiring terminal type and are associated with a second predetermined communication protocol different from the first predetermined communication protocol. The example method includes receiving one or more first communication messages via the two or more of the plurality of wiring terminals associated with the first predetermined communication protocol over a first communication bus and translating the one or more first communication messages received over the first communication bus to the second predetermined communication protocol, resulting in one or more first translated messages. The one or more first translated messages may be routed to and communicated over a second communication bus via the two or more of the plurality of wiring terminals associated with the second predetermined communication protocol.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 8 is a flow diagram showing an illustrative method for programming the illustrative building controller of FIG. 2;

FIG. 9 is a flow diagram showing an illustrative method;

Figure 1:
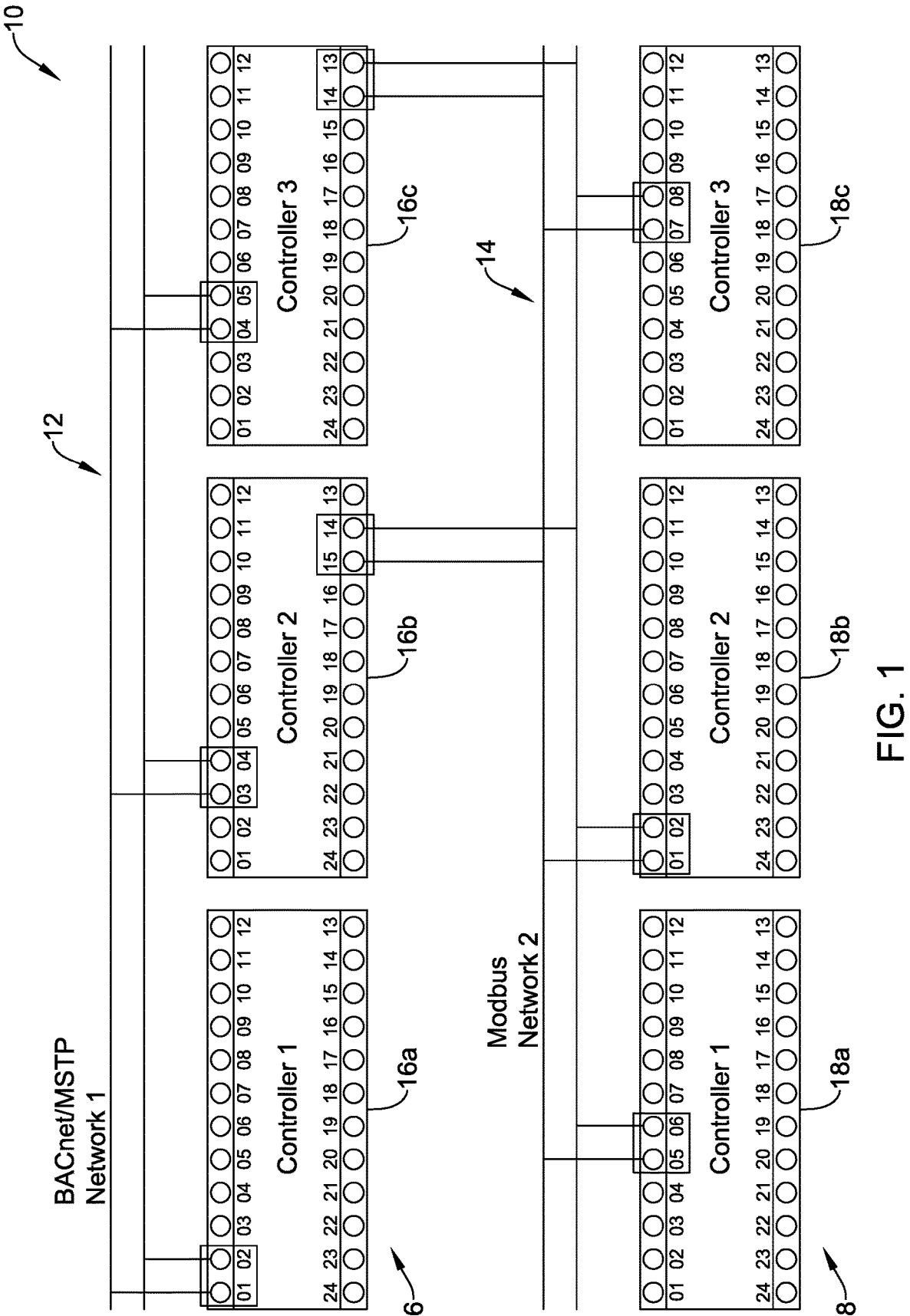
FIG. 1 is a schematic block diagram of an illustrative building control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/of" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building control system 10. The illustrative building control system 10 includes a first network 12 and a second network 14. While the first network 12 is labeled as being a BACnet network, and the second network 14 is labeled as being a Modbus network, this is merely illustrative. Each of the first network 12, the second network 14 and any additional networks (not shown) may be selected from any of a variety of communication protocols such as but not limited to BACnet, Modbus, UART, RS485, Sylk, C-bus, M-Bus, CAN Bus, KNX, LonWorks, Novar Net, and Dali, for example. Building controllers that communicate via the communication protocol implemented by the first network 12 may be operably coupled to and communicate with the first network 12. Building controllers that communicate via the communication protocol implemented by the second network 14 may be operably coupled to and communicate with the second network 14. Some building controllers may be configured to translate between different communication protocols, and thus may be operably coupled to and communicate with the first network 12 and the second network 14.

As shown, a total of three building controllers 16, individually labeled as 16a, 16b and 16c, are operably coupled to the first network 12. It will be appreciated that each of the building controllers 16 have a number of wiring terminals that are labeled 1 through 24, with the wiring terminals along the top of each building controller 16 sequentially numbered 01 through 12 in a first direction and the wiring terminals along the bottom of each building controller 16 sequentially numbered 13 through 24 in a second, opposing direction. It will be appreciated that this is merely illustrative, as each of the building controllers 16 may have any number of wiring terminals, which may be arranged and/or labeled in any suitable fashion.

In some cases, the specific wiring terminals designated for communicating with a particular network such as the first network 12 or the second network 14 may be different for each of the building controllers 16. The specific wiring terminals designated for communicating with the first network 12 and/or the second network 14 may be uniquely programmed for each of the building controllers 16. As an example, the building controller 16a uses wiring terminals 01 and 02 to communicate with the first network 12. The building controller 16b uses wiring terminals 03 and 04 to communicate with the first network 12 and uses wiring terminals 14 and 15 to communicate with the second network 14. The building controller 16c uses wiring terminals 04 and 05 to communicate with the first network 12 and uses wiring terminals 13 and 14 to communicate with the second network 14. As shown, the building controller 16a only communicates with the first network 12. The building controller 16b communicates with the first network 12 and with the second network 14. The building controller 16c communicates with the first network 12 and with the second network 14.

In some cases, the building controller 16b and/or the building controller 16c are configured to translate between the communication protocol implemented by the first network 12 and the communication protocol implemented by the second network 14. In some cases, the building controller 16b and/or the building controller 16c are configured to communicate only using the communication protocol implemented by the first network 12, but can "route" or "pass through" communications that use the communication protocol implemented by the second network 14, or vice versa. In some cases, the building controllers 16 may perform a router function, if desired. While only two networks 12, 14 are shown, each implementing a different communication protocol, some building controllers 16, 18 may be configured communicate, translate and/or route communication messages over two, three or more different communication protocols, with each communication protocol implemented on a different network.

As shown, a total of three building controllers 18, individually labeled as 18a, 18b and 18c, are operably coupled to the second network 14. It will be appreciated that each of the building controllers 18 have a number of wiring terminals that are labeled 1 through 24, with the wiring terminals along the top of each building controller 18 sequentially numbered 01 through 12 in a first direction and the wiring terminals along the bottom of each building controller 18 sequentially numbered 13 through 24 in a second, opposing direction. It will be appreciated that this is merely illustrative, as each of the building controllers 18 may have any number of wiring terminals, which may be arranged and/or labeled in any suitable fashion.

In some cases, the specific wiring terminals designated for communicating with a particular network such as the first network 12 or the second network 14 may be different for each of the building controllers 18. The specific wiring terminals designated for communicating with the first network 12 and/or the second network 14 may be uniquely programmed for each of the building controllers 18. As an example, the building controller 18*a* uses wiring terminals 04 and 05 to communicate with the second network 14. The building controller 18*b* uses wiring terminals 01 and 02 to communicate with the second network 14. The building controller 18*c* uses wiring terminals 07 and 08 to communicate with the second network 14.

In an example operation, building controller 16*b* may communicate with building controller 16*c*, 18*a*, 18*b* and/or 18*c* over the second network 14, and may communicate with building controller 16*b* and 16*c* over the first network 14. Each of the building controllers 16 and 18 may be configured to control operation of one or more features of a building control system. For example, some of the building controllers 16 and 18 may control operation of various components of a Heating, Ventilating and Air Conditioning (HVAC) system of a building. Some of the building controllers 16 and 18 may control operation of various components of a building lighting system. Some of the building controllers 16 and 18 may control operation of various components of a building security system. Some of the building controllers 16 and 18 may control operation of various components of a building fire system. These are just examples.

In one particular example, building controller 18*a* may control operation of a building fire system, and building controller 16*b* may control operation of a building Heating, Ventilating and Air Conditioning (HVAC) system. If a smoke sensor operatively coupled to an input terminal (e.g. terminal 23 programmed as an input terminal) of the building controller 18*a* indicates smoke in the building, the building controller 18*a* may sound an alarm by activating an output terminal (e.g. terminal 14 programmed as an output terminal) of the building controller 18*a* that is operatively coupled to a sound producing component in the building. The building controller 18*a* may also send a smoke alarm message onto the second network 14. The building controller 16*b* may receive the smoke alarm message via the second network 14. In response, the building controller 16*b* may close an air damper of the HVAC system to help slow the spread of smoke throughout the building by activating an output terminal (e.g. terminal 19 programmed as an output terminal) of the building controller 16*b* that is operatively coupled to the damper. This is just one example.

Figure 2:
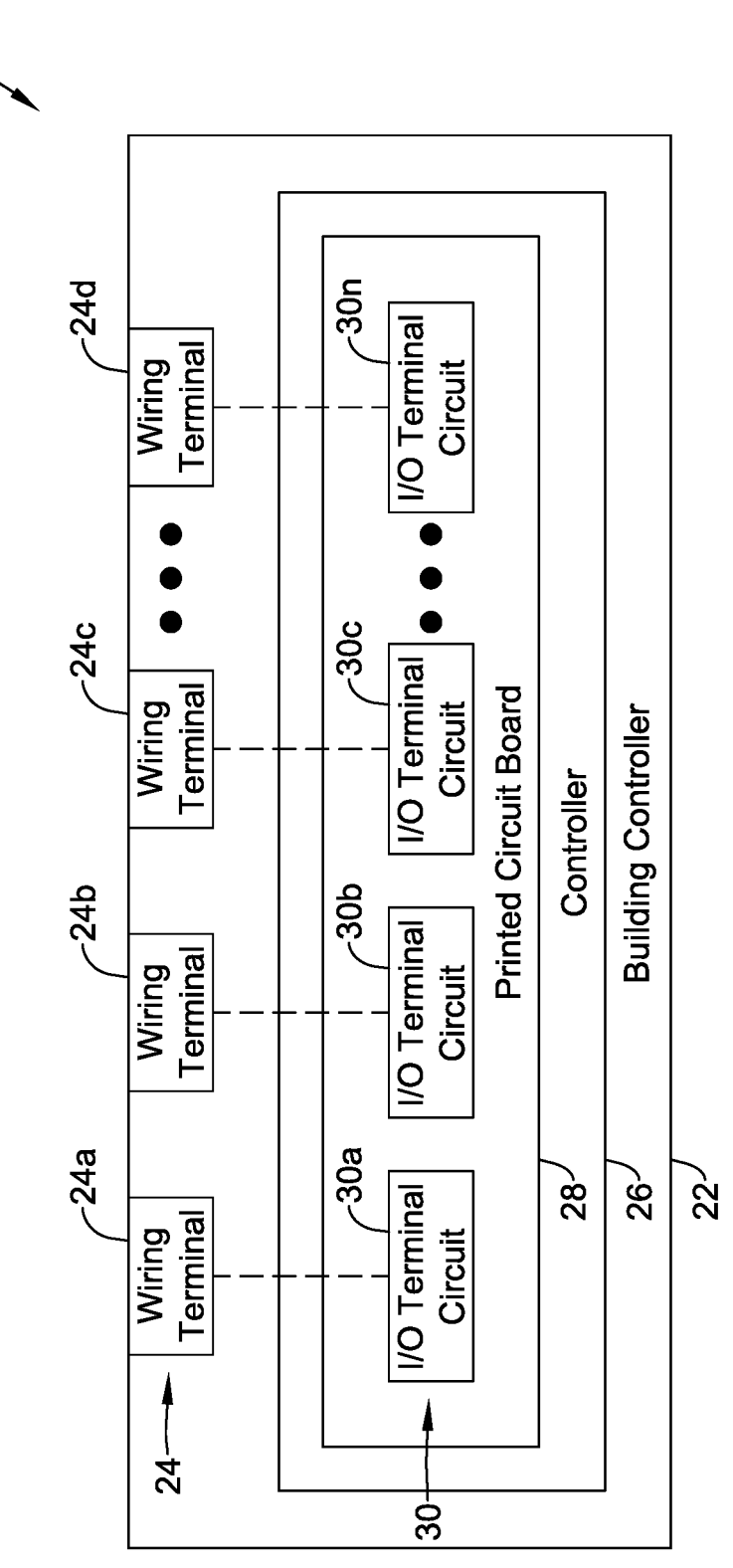
FIG. 2 is a schematic block diagram of an illustrative building controller usable in the illustrative building control system of FIG. 1.

FIG. 2 is a schematic block diagram of an illustrative building controller 20 that may be considered as being an example of one of the building controllers 16 and 18. The illustrative building controller 20 includes a housing 22. A plurality of wiring terminals 24, individually labeled as 24*a*, 24*b*, 24*c* through 24*n* are secured relative to the housing 22 and are physically accessible from outside of the housing 22 such that an installer is able to connect wires to any of the wiring terminals 24 even after the building controller 20 has been mounted to a wall or within an electrical panel. In some cases, the building controller 20 may be configured to be mounted to a DIN rail that is either wall-mounted or panel-mounted, for example.

The illustrative building controller 20 includes a controller 26 that is housed by the housing 22 and is operably coupled to the plurality of wiring terminals 24. In some cases, the controller 26 is field programmable to set each of two or more of the plurality of wiring terminals 24 to a particular one of a plurality of wiring terminal types including an input wiring terminal type, an output wiring terminal type, and a communication wiring terminal type where the communication wiring terminal type operates in accordance with a predetermined communication protocol. The predetermined communication protocol may be field programmable to one of two or more different communication protocols.

In some cases, the input wiring terminal type is set when the corresponding wiring terminal 24 is to receive an input signal from, for example, a remote sensor. The output wiring terminal type may be set when the corresponding wiring terminal 24 is to provide a control signal to a remote actuator or the like. The communication wiring terminal type may be set when the corresponding wiring terminal 24 is to be used to communicate with a remote device using the predetermined communication protocol.

In some instances, a first one of the plurality of wiring terminals 24 has the input wiring terminal type or the output wiring terminal type as a default setting, and the controller 26 is field programmable to change the first one of the plurality of wiring terminals 24 to the communication wiring terminal type. A first one of the plurality of wiring terminals 24 may have the communication wiring terminal type by default, and the controller 26 is field programmable to change the first one of the plurality of wiring terminals 24 to the input wiring terminal type or the output wiring terminal type.

In some cases, the controller 26 includes a printed circuit board 28. The printed circuit board 28 may include a number of I/O terminal circuits 30, individually labeled as 30*a*, 30*b*, 30*c* and through 30*n*, that are mounted to the printed circuit board 28. In the example shown, each of the number of I/O terminal circuits 30 are operatively coupled to a corresponding one of the plurality of wiring terminals 24. That is, there may be a separate I/O terminal circuit 30 dedicated to each of the plurality of wiring terminals 24. In some cases, each of the plurality of I/O terminal circuits 30 include an I/O device separately packaged and mounted to the printed circuit board 28, and one or more external devices that are external to the I/O device also mounted to the printed circuit board 28. In some instances, each of the I/O devices include a number of device pins including one or more device input pins, one or more device output pins, and two or more device communication pins.

When a first one of the plurality of wiring terminals 24 is set to be of the input wiring terminal type, the corresponding I/O device is configured to operatively couple the first one of the plurality of wiring terminals 24 to one of the one or more device input pins of the I/O device. When the first one of the plurality of wiring terminals 24 is set to be of the output wiring terminal type, the corresponding I/O device is configured to operatively couple the first one of the plurality of wiring terminals 24 to one of the one or more device output pins of the I/O device. When the first one of the plurality of wiring terminals 24 is set to be of the communication wiring terminal type, the corresponding I/O device is configured to operatively couple the first one of the plurality of wiring terminals 24 to one of the two or more device communication pins of the I/O device. It will be appreciated that example I/O device pins are visible in FIGS. 3 and 4. In some cases, the I/O device that corresponds to the first one of the plurality of wiring terminals 24 may be field programmable to set the first one of the plurality of wiring terminals 24 to the particular one of the plurality of wiring terminal types using commands sent to the I/O device via one or more of the device communication pins of the I/O device.

Figure 3:
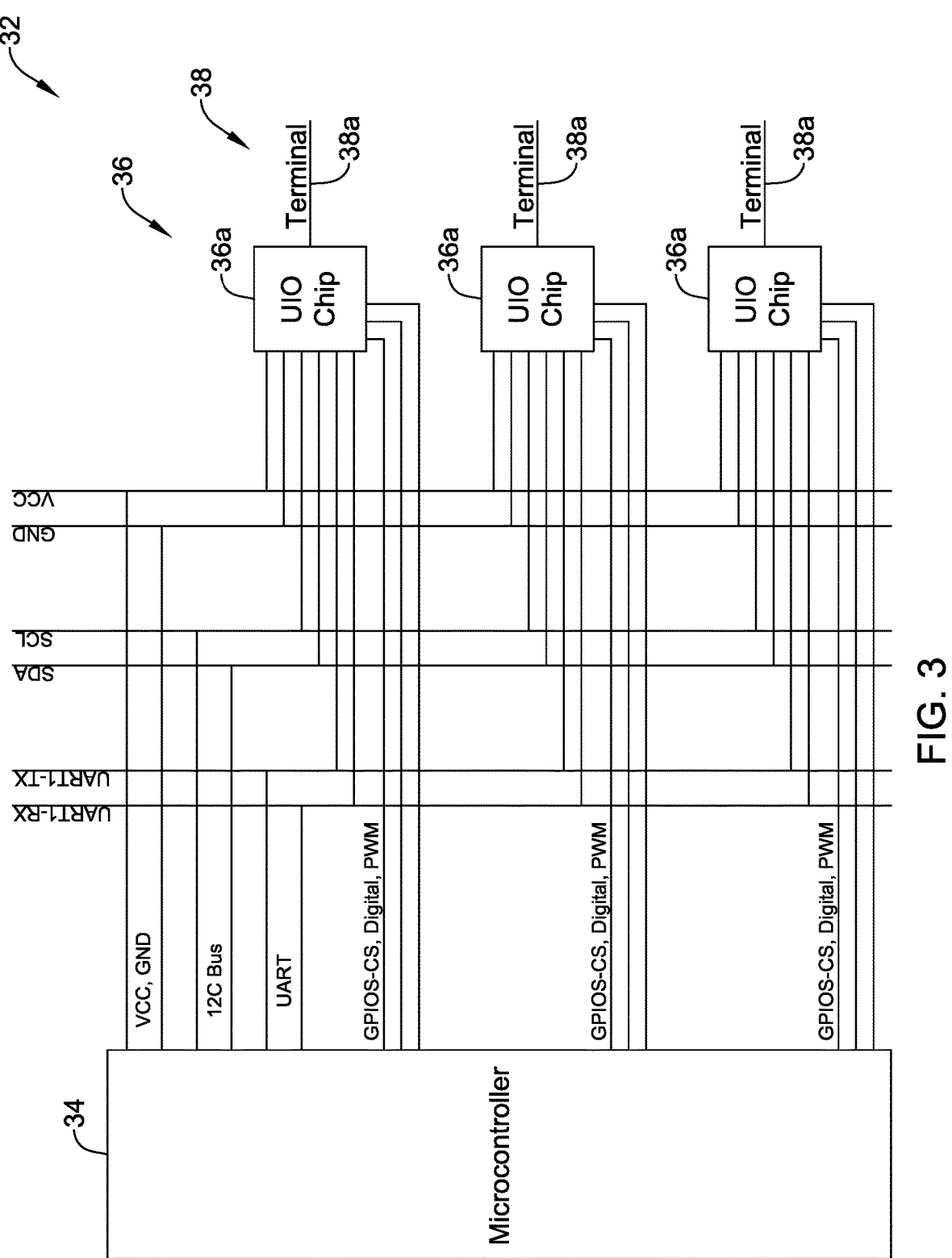
FIG. 3 is a schematic block diagram of an I/O portion of an illustrative building controller usable in the illustrative building control system of FIG. 1.

FIG. 3 is a schematic block diagram of an I/O portion 32 of an illustrative building controller usable in the illustrative building control system 10 of FIG. 1. In some cases, the I/O portion 32 shown in FIG. 3 may be representative of the I/O terminal circuits 30 and controller 26 supporting three wiring terminals 24 of the building controller 20.

In the example shown, the I/O portion 32 includes a microcontroller 34. Universal Input/Output (UIO) chips 36, individually labeled as 36a, 36b and 36c, are each operably coupled to a single wiring terminal 38, individually labeled as 38a, 38b and 38c. This is merely illustrative, as the I/O portion 32 will in many cases have a greater number of UIO chips 36 and corresponding wiring terminals 38. The UIO chips 36 may be considered as being an example of the I/O devices referenced with respect to FIG. 2 as being part of the I/O terminal circuits 30. Each of the UIO chips 36 are operably coupled to a number of wiring leads or conductive traces on a circuit board, connecting to the microcontroller 34. These wiring leads or conductive traces include communication paths such as UART1-RX and UART1-TX, SCL and SDA, along with power paths GND and VCC. These wiring leads or conductive traces also include a 12C bus, a UART bus and a number of wiring paths for Chip Select (CS), General Purpose Input/Output (GPIO)-Digital and GPIO-Analog (PWM).

Figure 4:
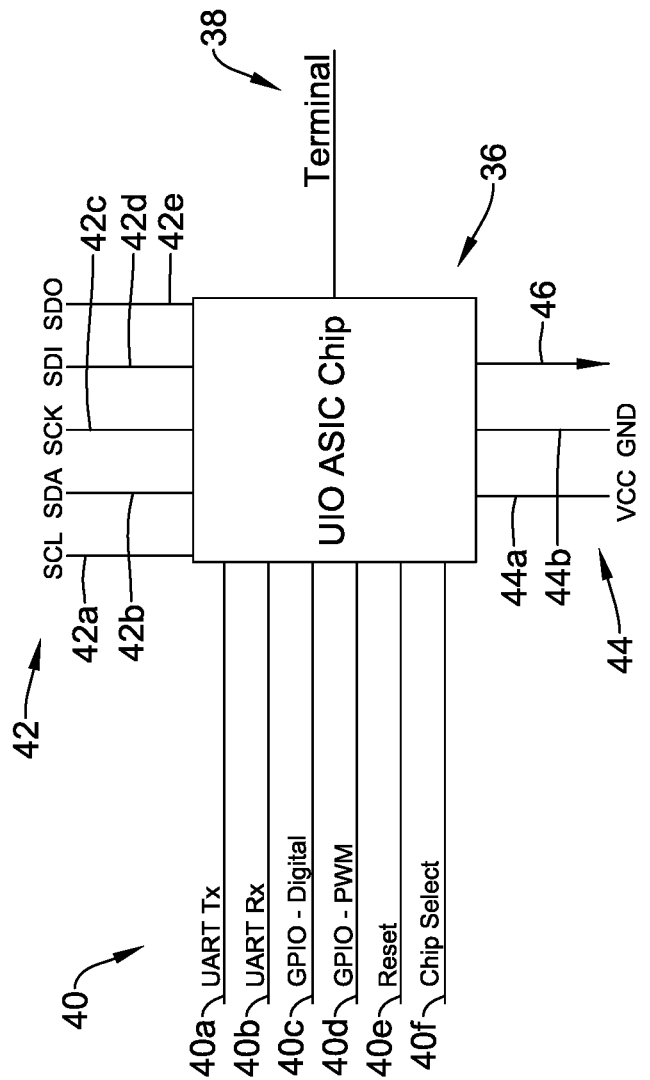
FIG. 4 is a schematic block diagram of a UIO ASIC Chip suitable for use with the illustrative building controller of FIG. 3.

FIG. 4 is a schematic block diagram of a UIO Application Specific Integrated Circuit (ASIC) Chip suitable for use with the illustrative building controller of FIG. 3, and in the example shown represents one of the UIO chips 36 of FIG. 3. The UIO ASIC chip can be programmed using the UART (UART Tx, UART Rx), I2C (SCL, SDA) and/or the SPI (SCK, SDI, SDO) interface. The terminal pin 38 (wiring terminal) is exposed to the outside of the housing, such that a user can attach a wire to it. The UIO ASIC chip of FIG. 4 can be seen as including a number of pins 40, including a UART Tx pin 40a, a UART Rx pin 40b, a GPIO-digital pin 40c, a GPIO-analog (PWM) pin 40d, a reset pin 40e and a Chip select pin 40f. The UIO ASIC chip also includes a number of pins 42, including an SCL pin 42a, an SDA pin 42b, an SCK pin 42c supporting the SPI interface protocol, and an SDI pin 42d and an SDO pin 42e supporting the I2C interface protocol. The illustrative UIO ASIC chip also includes power pins 44, including a VCC pin 44a and a GND pin 44b. The voltage applied to the VCC pin 44a may be at 3.3 volts, 6 volts, 9 volts, 12 volts and/or any other suitable voltage. It is contemplated that the voltage can be stepped up or down by the additional components 46 operatively coupled to the UIO ASIC chip, depending on the function of the corresponding terminal pin 38.

The UIO ASIC chip may interface with one or more additional components 46, such as but not limited to line drivers, transceivers, inductors, capacitors, small transformers and optical isolation components, for example. If the terminal pin 38 is acting like any of DI (digital input), DO (digital output), AI (analog input) or AO (analog output), it will be driven based on either the GPIO-Digital 40c pin or the GPIO-Analog (PWM) pin 40d. If the terminal pin 38 is programmed to be a communication terminal, the data will primarily be driven from one of the UART/I2C/SPI pins. The reset pin 40e brings the UIO ASIC chip back to a default configuration.

Figure 5:
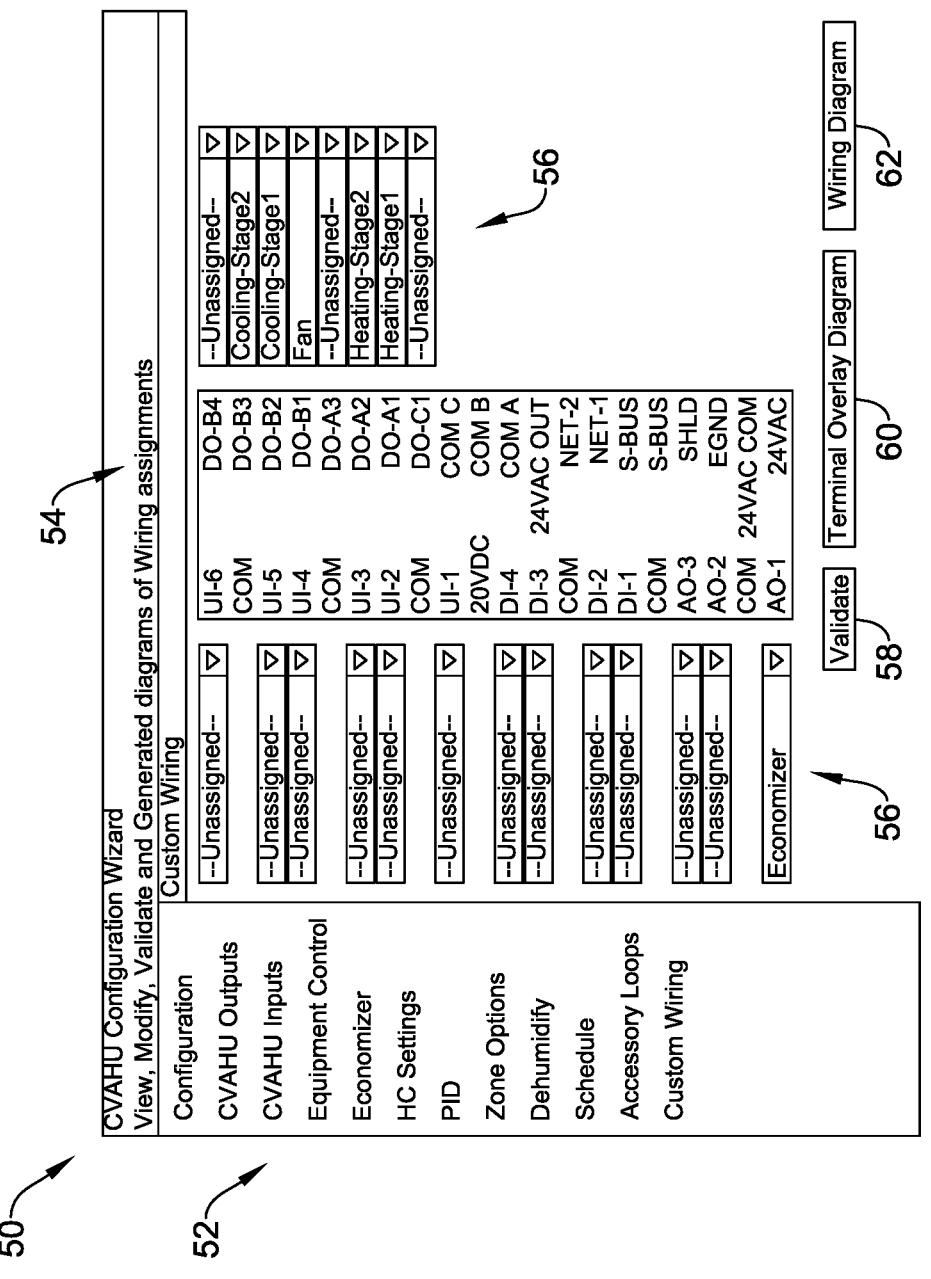
FIG. 5 shows an illustrative tool for programming the illustrative building controller of FIG. 2.

FIG. 5 shows an illustrative tool 50 for programming a building controller such as any of the building controllers 16, 18, 20 and 32. In some cases, the tool 50 may be a standalone tool that may be temporarily wired to the building controllers 16, 18, 20 and 32, or connected to one of the building controllers 16, 18, 20 and 32 via a building network. In some cases, the tool 50 may represent a functionality that is built into one of the building controllers 16, 18, 20 and 32. The illustrative tool 50 includes a menu 52 along a left side of a display. As shown, the Custom Wiring icon is highlighted or bolded, indicating that it has been selected. As a result, the tool 50 displays a wiring plan 54 that shows each of the available wiring terminals of the building controller. For some of the wiring terminals, the wiring plan 54 also shows a pull-down menu 56 that allows selection of a different use for a particular wiring terminal, or perhaps allows assigning a use to a pin that is currently unassigned. Some wiring terminals are not programmable, or their programming is conflicted out by the selection made for one or more other terminals, and hence do not include a pull-down menu 56 for that particular wiring terminal.

For some of the terminals, the pull-down menu 56 may allow a user to set the corresponding terminal pin to an input wiring terminal type, an output wiring terminal type or a communication wiring terminal type. In some cases, the pull-down menu 56 may allow the user to set the corresponding pin to an input wiring terminal type (digital), an input wiring terminal type (analog—PWM), an output wiring terminal type (digital), an output wiring terminal type (analog—PWM), and/or a communication wiring terminal with a corresponding communication protocol (e.g. BACnet, Modbus, UART, RS485, Sylk, C-bus, M-Bus, CAN Bus, KNX, LonWorks, Novar Net, and Dali, for example). These are just examples.

The illustrative tool 50 includes a Validate button 58, a Terminal Overlay Diagram button 60 and a Wiring Diagram button 62. The Validate button 58 may be selected to instruct the tool 50 to validate the assigned functions to ensure that the controller can operate with those assigned functions. The Terminal Overlay Diagram button 60 may be selected to instruct the tool 50 to display wiring labels that can be printed out and pasted onto the building controller housing to label what each wiring terminal is for. The Wiring Diagram button 62 may be selected to instruct the tool 50 to print out a wiring diagram.

Figure 6:
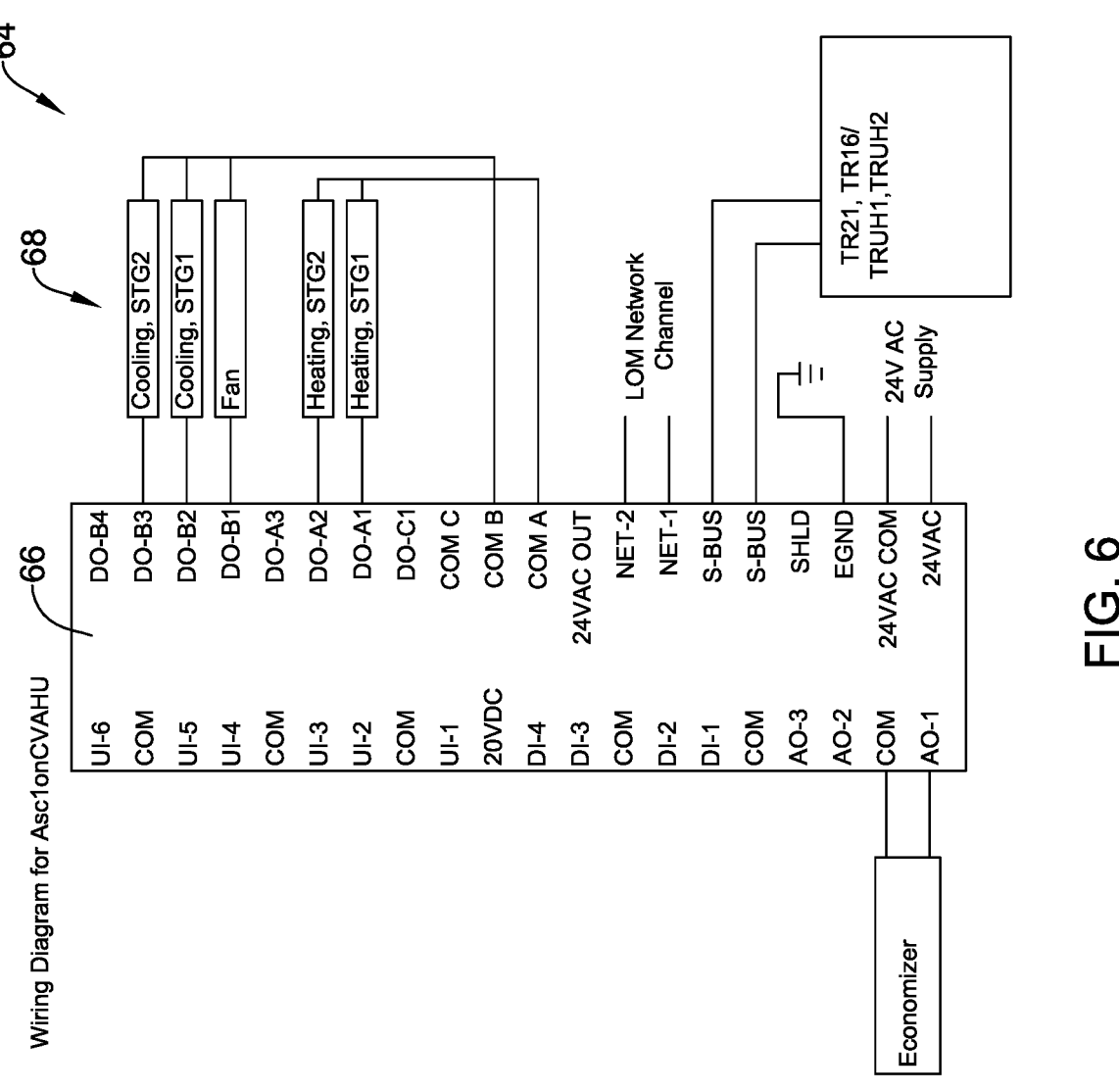
FIG. 6 is a schematic block diagram of an illustrative wiring diagram produced by the illustrative tool of FIG. 5.

FIG. 6 shows an example of a wiring diagram 64 that may be displayed. The wiring diagram 64 includes a representation 66 that shows all of the wiring terminals as well as the devices 68 that are physically wired to particular wiring terminals of the building controller. As shown, several digital output pins DO-B3 and DO-B2 are connected to second stage cooling and first stage cooling, respectively. A digital output pin DO-B1 is connected to a fan. Heating is connected to several other digital output pins. First stage heating is connected to a pin DO-A1 while second stage heating is connected to a pin DO-S2. The cooling stages and fan are also connected to a Communication (COM) B pin while the heating stages are connected to a COM A pin. An economizer is connected to an analog pin AO-1 and a COM pin. Other devices, if connected, would be shown in a similar fashion.

Figure 7:
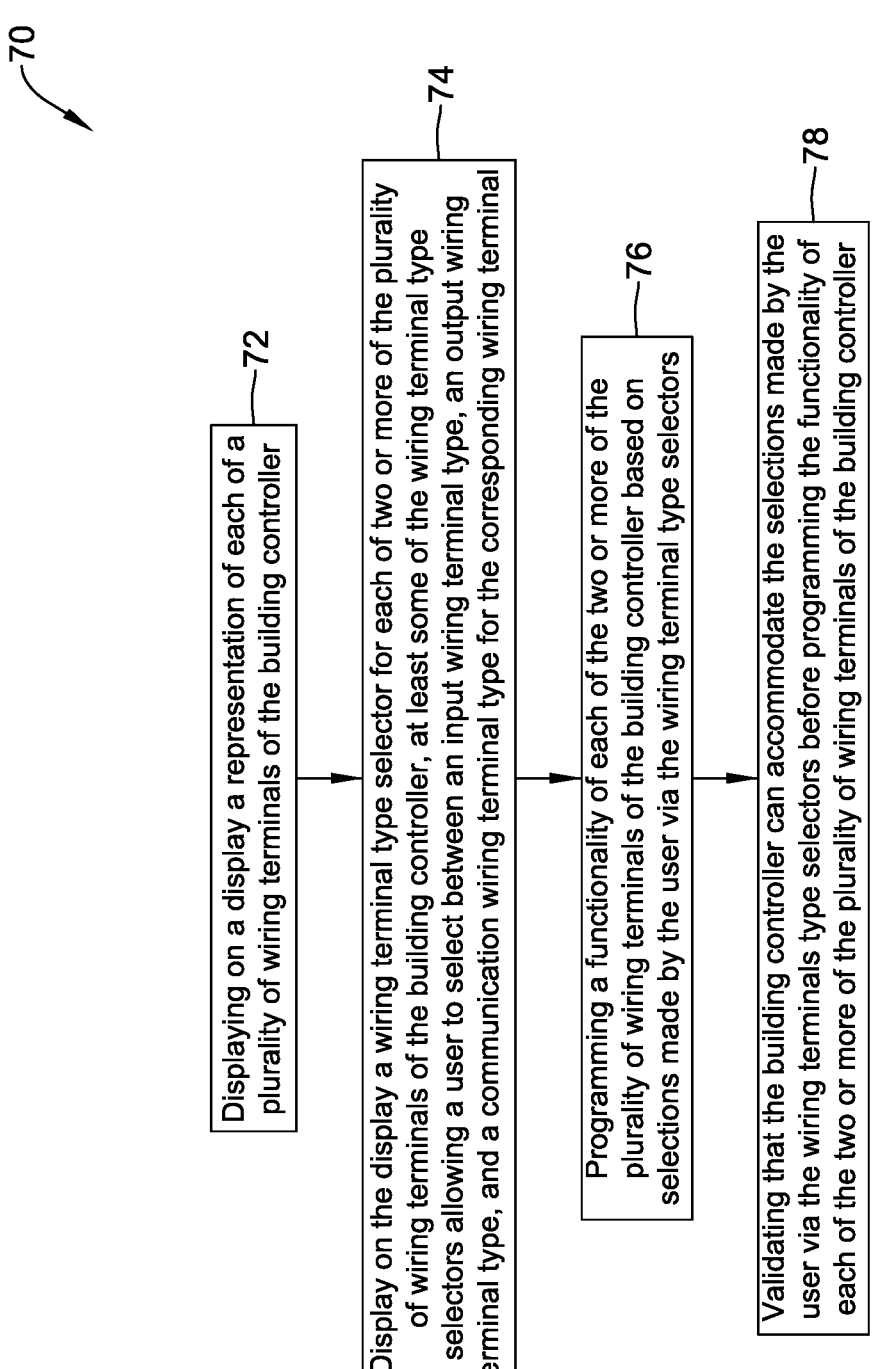
FIG. 7 is a flow diagram showing an illustrative method for programming the illustrative building controller of FIG. 2.

FIG. 7 is a flow diagram showing an illustrative method 70 for programming a building controller (such as any of the building controllers 16, 18, 20 and 32). The illustrative method 70 includes displaying on a display a representation of each of a plurality of wiring terminals of the building controller, as indicated at block 72. A wiring terminal type selector for each of two or more of the plurality of wiring terminals of the building controller is displayed on the display. At least some of the wiring terminal type selectors allow a user to select between an input wiring terminal type, an output wiring terminal type, and a communication wiring terminal type for the corresponding wiring terminal, as indicated at block 74. A functionality of each of the two or more of the plurality of wiring terminals of the building controller is programmed based on selections made by the user via the wiring terminal type selectors, as indicated at block 76.

In some cases, the illustrative method 70 may include validating that the building controller can accommodate the selections made by the user via the wiring terminal type selectors before programming the functionality of each of the two or more of the plurality of wiring terminals of the building controller, as indicated at block 78. In some cases, programming each of the two or more of the plurality of wiring terminals of the building controller may include programming each of two or more I/O terminal circuits of the building controller, wherein each of the two or more I/O terminal circuits of the building controller is associated with a corresponding one of the two or more of the plurality of wiring terminals of the building controller.

FIG. 8 is a flow diagram showing an illustrative method 80 for programming a building controller (such as any of the building controllers 16, 18, 20 and 32). The illustrative method 80 includes displaying on a display a representation of each of a plurality of wiring terminals of the building controller, as indicated at block 82. A wiring terminal type selector for each of two or more of the plurality of wiring terminals of the building controller is displayed on the display, at least some of the wiring terminal type selectors allowing a user to select between an input wiring terminal type, an output wiring terminal type, and a communication wiring terminal type for the corresponding wiring terminal, as indicated at block 84. A functionality of each of the two or more of the plurality of wiring terminals of the building controller is programmed based on selections made by the user via the wiring terminal type selectors, as indicated at block 86.

In some cases, and for those wiring terminals of the building controller that the user selected the communication wiring terminal type, if any, the illustrative method 80 may include programming the corresponding wiring terminals to operate in accordance with a predetermined communication protocol, as indicated at block 88. In some cases, the illustrative method 80 may include selecting the predetermined communication protocol from two or more different predetermined communication protocols, as indicated at block 90. The two or more different predetermined communication protocols may include two or more of BACnet, Modbus, UART, RS485, Sylk, C-bus, M-Bus, CAN Bus, KNX, LonWorks, Novar Net, and Dali, for example.

FIG. 9 is a flow diagram showing an illustrative method 92 that includes setting each of a plurality of wiring terminals of a building controller to a particular one of a plurality of wiring terminal types including an input wiring terminal type, an output wiring terminal type, and a communication wiring terminal type, as indicated at block 94. Two or more of the plurality of wiring terminals are set to the communication wiring terminal type and are associated with a first predetermined communication protocol, and two or more of the plurality of wiring terminals are set to the communication wiring terminal type and are associated with a second predetermined communication protocol different from the first predetermined communication protocol, as indicated at block 96.

One or more first communication messages are received via the two or more of the plurality of wiring terminals associated over the first predetermined communication protocol over a first communication bus, as indicated at block 98. The one or more first communication messages received over the first communication bus are translated to the second predetermined communication protocol, resulting in one or more first translated messages, as indicated at block 100. The one or more first translated messages are routed via the two or more of the plurality of wiring terminals associated with the second predetermined communication protocol over a second communication bus, as indicated at block 102.

Figure 10:
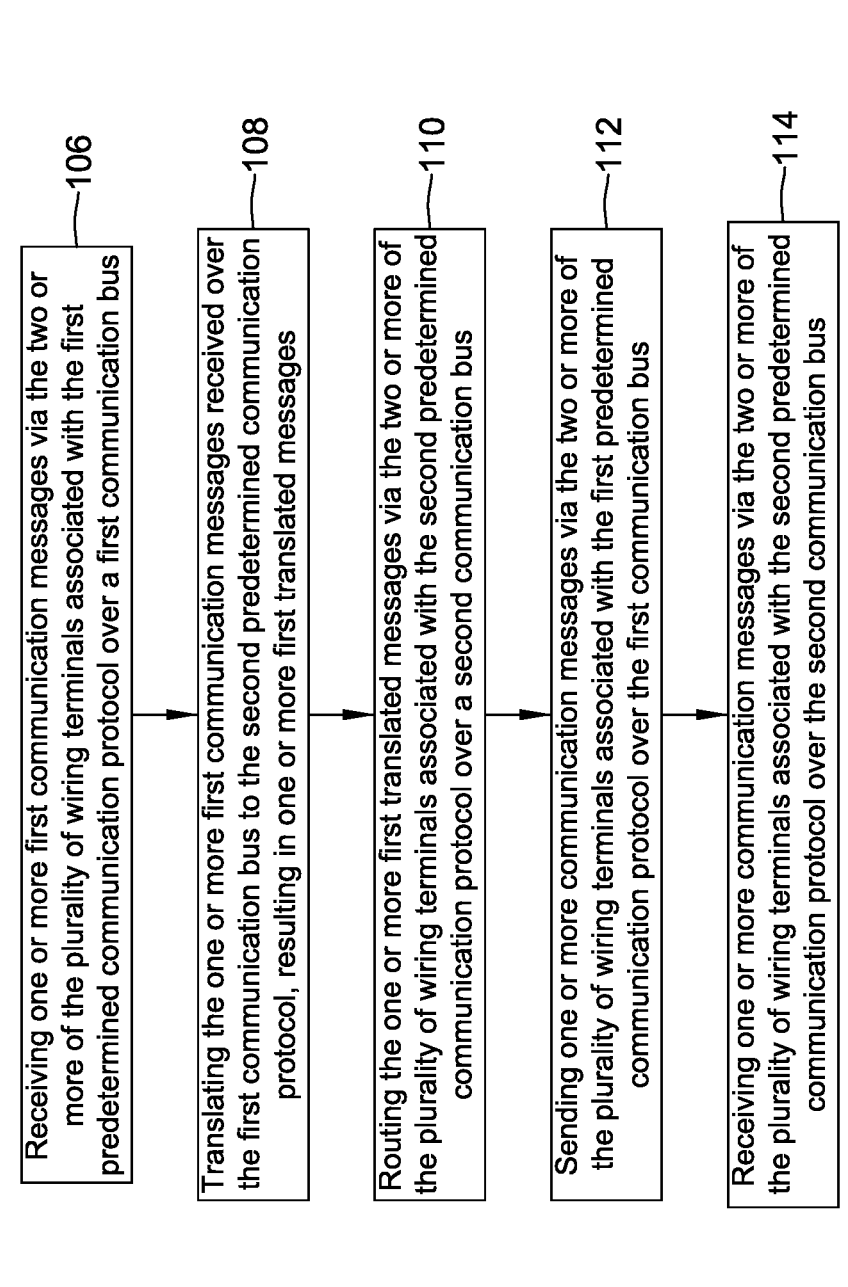
FIG. 10 is a flow diagram showing an illustrative method.

FIG. 10 is a flow diagram showing an illustrative method 104 that includes receiving one or more first communication messages via the two or more of the plurality of wiring terminals associated with the first predetermined communication protocol over a first communication bus, as indicated at block 106. The one or more first communication messages received over the first communication bus are translated to the second predetermined communication protocol, resulting in one or more first translated messages, as indicated at block 108. The one or more first translated messages are routed via the two or more of the plurality of wiring terminals associated with the second predetermined communication protocol over a second communication bus, as indicated at block 110. In some cases, the method 104 includes sending one or more communication messages via the two or more of the plurality of wiring terminals associated with the first predetermined communication protocol over the first communication bus, as indicated at block 112. The method 104 may include receiving one or more communication messages via the two or more of the plurality of wiring terminals associated with the second predetermined communication protocol over the second communication bus, as indicated at block 114.

Figure 11:
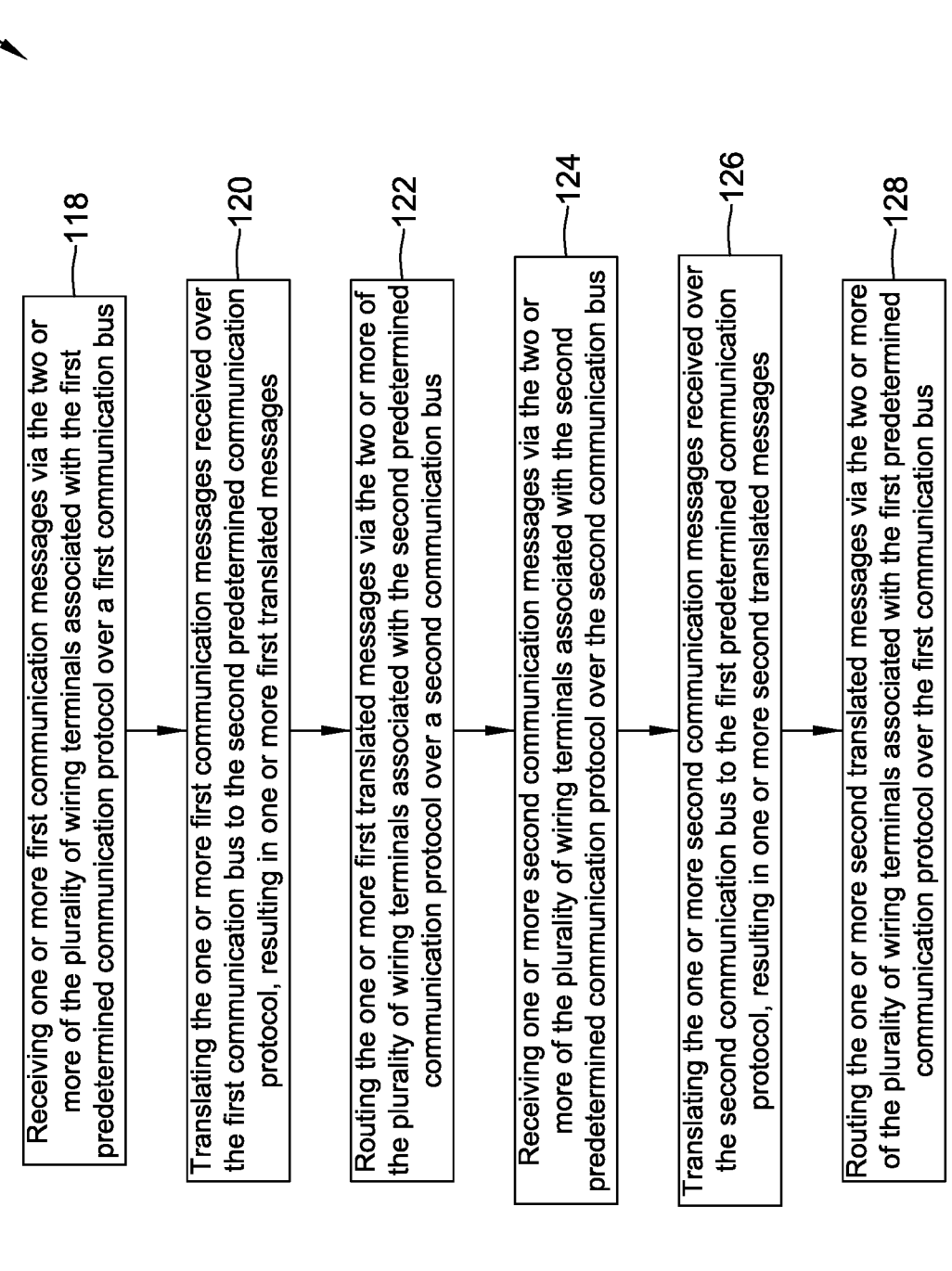
FIG. 11 is a flow diagram showing an illustrative method.

FIG. 11 is a flow diagram showing an illustrative method 116 that includes receiving one or more first communication messages via the two or more of the plurality of wiring terminals associated with the first predetermined communication protocol over a first communication bus, as indicated at block 118. The one or more first communication messages received over the first communication bus are translated to the second predetermined communication protocol, resulting in one or more first translated messages, as indicated at block 120. The one or more first translated messages are routed via the two or more of the plurality of wiring terminals associated with the second predetermined communication protocol over a second communication bus, as indicated at block 122.

In some cases, the illustrative method 116 may include receiving one or more second communication messages via the two or more of the plurality of wiring terminals associated with the second predetermined communication protocol over the second communication bus, as indicated at block 124. The one or more second communication messages received over the second communication bus are translated to the first predetermined communication protocol, resulting in one or more second translated messages, as indicated at block 126. The one or more second translated messages are routed via the two or more of the plurality of wiring terminals associated with the first predetermined communication protocol over the first communication bus, as indicated at block 128.

Figure 12:
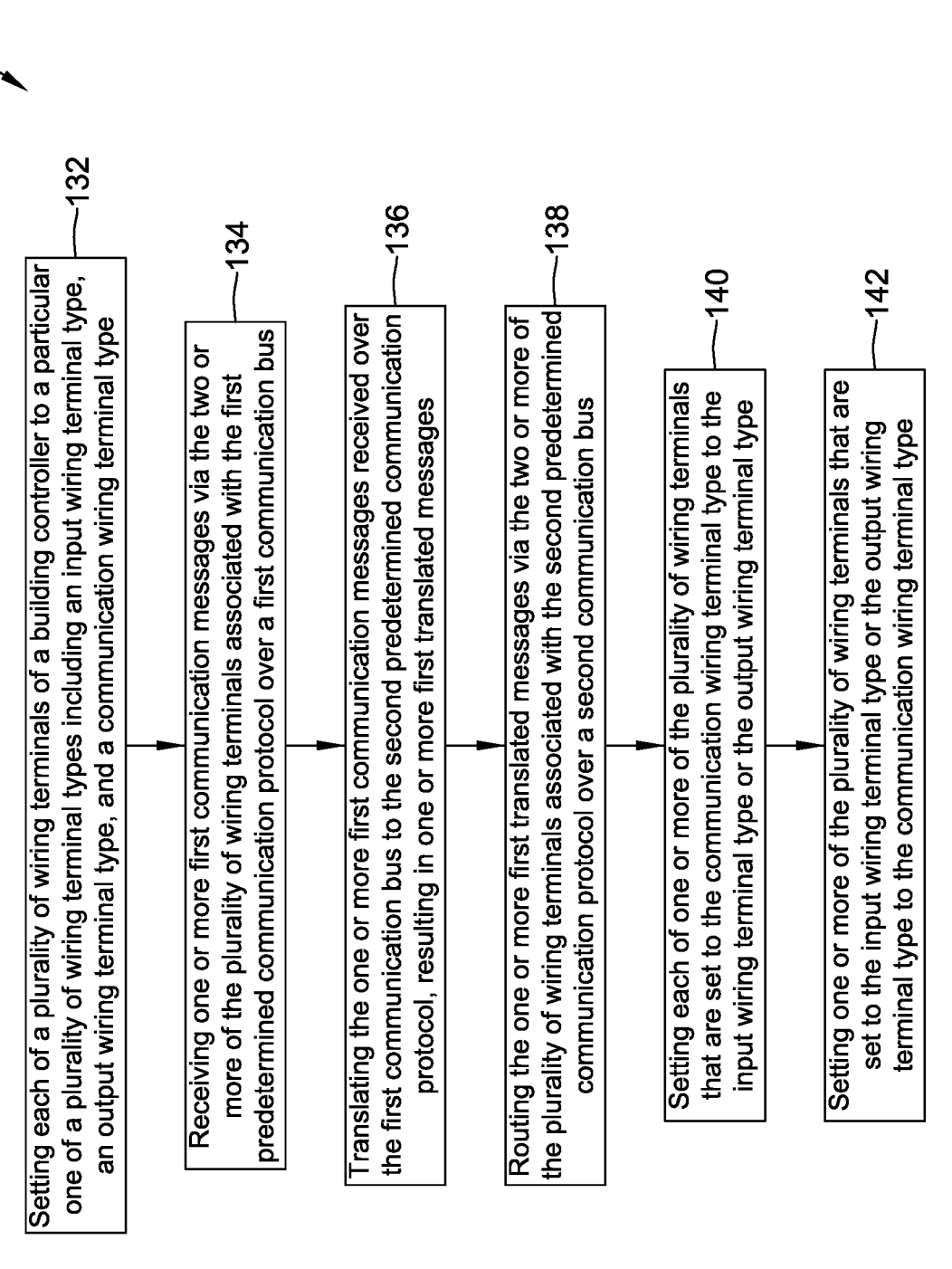
FIG. 12 is a flow diagram showing an illustrative method.

FIG. 12 is a flow diagram showing an illustrative method 130 that includes setting each of a plurality of wiring terminals of a building controller to a particular one of a plurality of wiring terminal types including an input wiring terminal type, an output wiring terminal type, and a communication wiring terminal type, as indicated at block 132. One or more first communication messages are received via the two or more of the plurality of wiring terminals associated with the first predetermined communication protocol over a first communication bus, as indicated at block 134. The one or more first communication messages received over the first communication bus may be translated to the second predetermined communication protocol, resulting in one or more first translated messages, as indicated at block 136. The one or more first translated messages are routed via the two or more of the plurality of wiring terminals associated with the second predetermined communication protocol over a second communication bus, as indicated at block 138.

In some cases, in response to receiving one or more first communication messages via the two or more of the plurality of wiring terminals associated with the first predetermined communication protocol over the first communication bus, the building controller need not translate the one or more message to the second predetermined communication protocol. Instead, the building controller may interpret the one or more first communication messages and perform an operation based at least in part on the one or more first communication messages and logic of the building controller. For example, the building controller may activate or de-activate one or more of its input wiring terminals and/or output wiring terminals in response to receiving one or more first communication messages. In some cases, the building controller may assembly and send one or more second communication messages via the two or more of the plurality of wiring terminals associated with the second predetermined communication protocol over the second communication bus. The second communication messages may not be translated versions of the one or more first communication messages, but rather may be generated by the building controller based on internal logic of the building controller. In some cases, the second communication messages that are generated by the building controller may be in response to one or more of the first communication messages and based on logic of the building controller.

In some cases, the illustrative method 130 may include setting each of one or more of the plurality of wiring terminals that are set to the communication wiring terminal type to the input wiring terminal type or the output wiring terminal type, as indicated at block 140. The illustrative method 130 may further include setting one or more of the plurality of wiring terminals that are set to the input wiring terminal type or the output wiring terminal type to the communication wiring terminal type, as indicated at block 142.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A building controller comprising:

a housing;

a plurality of wiring terminals secured relative to the housing and physically accessible from outside of the housing; and a controller housed by the housing and operatively coupled to the plurality of wiring terminals, wherein:

the controller is field programmable to set each of two or more of the plurality of wiring terminals to a particular one of a plurality of wiring terminal types including an input wiring terminal type, an output wiring terminal type, and a communication wiring terminal type;

two or more of the plurality of wiring terminals set to the communication wiring terminal type operate in accordance with a first predetermined communication protocol and two or more of the plurality of wiring terminals set to the communication wiring terminal type operate in accordance with a second predetermined communication protocol different from the first predetermined communication protocol;

the controller is configured to:

translate one or more first communication messages, received over a first communication bus via the two or more of the plurality of wiring terminals associated with the first predetermined communication protocol, to the second predetermined communication protocol resulting in one or more first translated messages; and route the one or more first translated messages via the two or more of the plurality of wiring terminals associated with the second predetermined communication protocol over a second communication bus.

2. The building controller of claim 1, wherein:

the input wiring terminal type is set when the corresponding wiring terminal is to receive an input signal from a remote sensor;

the output wiring terminal type is set when the corresponding wiring terminal is to provide a control signal to a remote actuator; and the communication wiring terminal type is set when the corresponding wiring terminal is to be used to communicate with a remote device using the first predetermined communication protocol or the second predetermined communication protocol.

3. The building controller of claim 1, wherein a first one of the plurality of wiring terminals has the input wiring terminal type or the output wiring terminal type as a default setting, and wherein the controller is field programmable to change the first one of the plurality of wiring terminals to the communication wiring terminal type.

4. The building controller of claim 1, wherein a first one of the plurality of wiring terminals has the communication wiring terminal type by default, and wherein the controller is field programmable to change the first one of the plurality of wiring terminals to the input wiring terminal type or the output wiring terminal type.

5. The building controller of claim 1, wherein the controller includes a printed circuit board, with a plurality of I/O terminal circuits mounted to the printed circuit board, wherein each of the plurality of I/O terminal circuits is operatively coupled to a corresponding one of the plurality of wiring terminals.

6. The building controller of claim 5, wherein each of the plurality of I/O terminal circuits includes an I/O device and one or more external devices external to the I/O device, wherein the I/O device includes a plurality of device pins including one or more device input pins, one or more device output pins and two or more device communication pins.

7. The building controller of claim 6, wherein:

when a first one of the plurality of wiring terminals is set to be of the input wiring terminal type, the corresponding I/O device is configured to operatively couple the first one of the plurality of wiring terminals to one of the one or more device input pins;

when the first one of the plurality of wiring terminals is set to be of the output wiring terminal type, the corresponding I/O device is configured to operatively couple the first one of the plurality of wiring terminals to one of the one or more device output pins; and when the first one of the plurality of wiring terminals is set to be of the communication wiring terminal type, the corresponding I/O device is configured to operatively couple the first one of the plurality of wiring terminals to one of the two or more device communication pins.

8. The building controller of claim 7, wherein the I/O device that corresponds to the first one of the plurality of wiring terminals is field programmable to set the first one of the plurality of wiring terminals to the particular one of the plurality of wiring terminal types using one or more of the device communication pins.

9. The building controller of claim 1, wherein the first predetermined communication protocol and the second predetermined communication protocol are field programmable to one of two or more different communication protocols.

10. The building controller of claim 9, wherein the two or more different communication protocols include two or more of Bacnet, Modbus, UART, RS485, Sylk, C-bus, M-Bus, CAN Bus, KNX, LonWorks, Novar Net, and Dali.

11. A method for programming a building controller, comprising:

displaying on a display a representation of each of a plurality of wiring terminals of the building controller;

displaying on the display a wiring terminal type selector for each of two or more of the plurality of wiring terminals of the building controller, at least some of the wiring terminal type selectors allowing a user to select between an input wiring terminal type, an output wiring terminal type, and a communication wiring terminal type for the corresponding wiring terminal; and programming a functionality of each of the two or more of the plurality of wiring terminals of the building controller based on selections made by the user via the wiring terminal type selectors, wherein two or more of the plurality of wiring terminals are set to the communication wiring terminal type and are associated with a first predetermined communication protocol, and two or more of the plurality of wiring terminals are set to the communication wiring terminal type and are associated with a second predetermined communication protocol different from the first predetermined communication protocol;

translating one or more first communication messages, received over a first communication bus via the two or more of the plurality of wiring terminals associated with the first predetermined communication protocol, to the second predetermined communication protocol resulting in one or more translated messages; and routing the one or more first translated messages via the two or more of the plurality of wiring terminals associated with the second predetermined communication protocol over a second communication bus.

12. The method of claim 11, further comprising validating that the building controller can accommodate the selections made by the user via the wiring terminal type selectors before programming the functionality of each of the two or more of the plurality of wiring terminals of the building controller.

13. The method of claim 11, wherein programming each of the two or more of the plurality of wiring terminals of the building controller comprises programming each of two or more I/O terminal circuits of the building controller, wherein each of the two or more I/O terminal circuits of the building controller is associated with a corresponding one of the two or more of the plurality of wiring terminals of the building controller.

14. The method of claim 11, wherein for those wiring terminals of the building controller that the user selected the communication wiring terminal type, if any, programming the corresponding wiring terminals to operate in accordance with at least one of the first predetermined communication protocol or the second predetermined communication protocol.

15. The method of claim 14, further comprising selecting the first predetermined communication protocol or the second predetermined communication protocol from two or more different predetermined communication protocols.

16. A method comprising:

programming each of a plurality of wiring terminals of a building controller to a particular one of a plurality of wiring terminal types including an input wiring terminal type, an output wiring terminal type, and a communication wiring terminal type;

wherein two or more of the plurality of wiring terminals are set to the communication wiring terminal type and are associated with a first predetermined communication protocol, and two or more of the plurality of wiring terminals are set to the communication wiring terminal type and are associated with a second predetermined communication protocol different from the first predetermined communication protocol;

receiving one or more first communication messages via the two or more of the plurality of wiring terminals associated with the first predetermined communication protocol over a first communication bus;

translating the one or more first communication messages received over the first communication bus to the second predetermined communication protocol, resulting in one or more first translated messages; and routing the one or more first translated messages via the two or more of the plurality of wiring terminals associated with the second predetermined communication protocol over a second communication bus.

17. The method of claim 16, comprising:

sending one or more communication messages via the two or more of the plurality of wiring terminals associated with the first predetermined communication protocol over the first communication bus; and receiving one or more communication messages via the two or more of the plurality of wiring terminals associated with the second predetermined communication protocol over the second communication bus.

18. The method of claim 16, comprising:

receiving one or more second communication messages via the two or more of the plurality of wiring terminals associated with the second predetermined communication protocol over the second communication bus;

translating the one or more second communication messages received over the second communication bus to the first predetermined communication protocol, resulting in one or more second translated messages; and routing the one or more second translated messages via the two or more of the plurality of wiring terminals associated with the first predetermined communication protocol over the first communication bus.

19. The method of claim 16, comprising setting each of one or more of the plurality of wiring terminals that are set to the communication wiring terminal type to the input wiring terminal type or the output wiring terminal type.

20. The method of claim 16, comprising setting one or more of the plurality of wiring terminals that are set to the input wiring terminal type or the output wiring terminal type to the communication wiring terminal type.

* * * * *